United States Patent
Greene et al.

(10) Patent No.: US 9,180,654 B2
(45) Date of Patent: Nov. 10, 2015

(54) REACTIVE FLUOROPOLYMER AND LASER-ENGRAVEABLE COMPOSITIONS AND PREPARATORY METHODS

(75) Inventors: Anna C. Greene, Henrietta, NY (US); Christine J. Landry-Coltrain, Fairport, NY (US); Steven Evans, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 367 days.

(21) Appl. No.: 13/456,323

(22) Filed: Apr. 26, 2012

(65) Prior Publication Data

US 2013/0284990 A1 Oct. 31, 2013

(51) Int. Cl.
| | |
|---|---|
| *F21V 9/04* | (2006.01) |
| *F21V 9/06* | (2006.01) |
| *G02B 5/22* | (2006.01) |
| *G02B 5/26* | (2006.01) |
| *B41C 1/05* | (2006.01) |
| *B29C 35/08* | (2006.01) |
| *B29C 73/16* | (2006.01) |
| *C08K 5/02* | (2006.01) |
| *C08L 27/12* | (2006.01) |
| *D06M 15/277* | (2006.01) |
| *B82Y 30/00* | (2011.01) |

(52) U.S. Cl.
CPC ... *B41C 1/05* (2013.01); *B82Y 30/00* (2013.01)

(58) Field of Classification Search
USPC .......... 101/395, 483; 252/587; 264/319, 400; 427/58, 125, 256, 372.2, 385.5, 388.1, 427/389.7, 389.9, 393.5, 393.6; 428/156, 428/172, 220, 323, 339, 421; 524/462, 544; 977/734, 742
See application file for complete search history.

(56) References Cited

U.S. PATENT DOCUMENTS

| | | | |
|---|---|---|---|
| 4,915,981 A | | 4/1990 | Traskos et al. |
| 5,719,009 A | | 2/1998 | Fan |
| 5,798,202 A | | 8/1998 | Cushner et al. |
| 7,223,524 B2 | * | 5/2007 | Hiller et al. ................ 430/281.1 |
| 7,290,487 B2 | | 11/2007 | Hiller |
| 2002/0014169 A1 | * | 2/2002 | Siler et al. ..................... 101/138 |
| 2004/0190941 A1 | * | 9/2004 | Thornton et al. ............. 399/159 |
| 2008/0248205 A1 | * | 10/2008 | Blanchet et al. .............. 427/282 |
| 2010/0151387 A1 | | 6/2010 | Blanchet et al. |
| 2011/0086204 A1 | | 4/2011 | Wohl, Jr. et al. |
| 2011/0089609 A1 | * | 4/2011 | Landry-Coltrain et al. .. 264/400 |

OTHER PUBLICATIONS

A. Priola, et al., "UV-curable systems containing perfluoropolyether structures: synthesis and characterisation", Macromol. Chem. Phys. 198, (1997) pp. 1893-1907.
A. C. Greene, et al., "Laser-Engraveable Elements and Method of Use", U.S. Appl. No. 13/456,301, filed Apr. 26, 2012.

* cited by examiner

*Primary Examiner* — Bijan Ahvazi
(74) *Attorney, Agent, or Firm* — J. Lanny Tucker

(57) ABSTRACT

A composition comprises a fluoropolymer such as an elastomeric fluoropolymer and at least 1 weight % of a fluoro-functionalized near-infrared radiation absorber. This composition can be formed into laser-engraveable layers for various elements that can be laser-engraved to provide relief images. The resulting laser-engraved elements can take various forms including flexographic printing members, and can be used to apply various inks to receiver materials in an imagewise fashion.

13 Claims, No Drawings

REACTIVE FLUOROPOLYMER AND LASER-ENGRAVEABLE COMPOSITIONS AND PREPARATORY METHODS

FIELD OF THE INVENTION

This invention relates to laser-imageable (laser-engraveable) compositions and reactive fluoropolymer compositions used to make them. The laser-engraveable compositions can be used in relief-forming elements such as flexographic printing precursors. This invention also relates to methods of preparing these compositions.

BACKGROUND OF THE INVENTION

Relief images can be provided and used in various articles for many different purposes. For example, the electronics, display, and energy industries rely on the formation of coatings and patterns of conductive materials to form circuits on organic and inorganic substrates. Such coatings and patterns are often provided using relief imaging methods and relief image forming elements. There is also need for means to provide fine wiring in various articles.

Flexography is a method of printing that is commonly used for high-volume printing runs. It is usually employed for printing on a variety of soft or easily deformed materials including but not limited to, paper, paperboard stock, corrugated board, polymeric films, fabrics, metal foils, glass, glass-coated materials, flexible glass materials, and laminates of multiple materials. Coarse surfaces and stretchable polymeric films are economically printed using flexography.

Flexographic printing members are sometimes known as "relief" printing members (for example, relief-containing printing plates, printing sleeves, or printing cylinders) and are provided with raised relief images onto which ink is applied for application to a printable material. While the raised relief images are inked, the relief "floor" should remain free of ink. The flexographic printing precursors are generally supplied with one or more imageable layers that can be disposed over a backing layer or substrate. Flexographic printing also can be carried out using a flexographic printing cylinder or seamless sleeve having the desired relief image.

Flexographic printing members can be provided from flexographic printing precursors that can be "imaged in-the-round" (ITR) using either a photomask or laser-ablatable mask (LAM) over a photosensitive composition (layer), or they can be imaged by direct laser engraving (DLE) of a laser-engraveable composition (layer) that is not necessarily photosensitive.

Gravure or intaglio printing members are also relief printing members in which the image to be printed comprises depressions or recesses on the surface of the printing member, where the printing area is localized to the areas of depression that define the pattern or image. The process for using gravure or intaglio printing members is the reverse of flexographic relief printing wherein an image is raised above the floor of the flexographic printing member and the printing area is localized at the contact area of the top surface protrusions.

Laser ablation or laser engraving can be used effectively with an appropriate laser-engraveable precursor to form images for either of the above-mentioned printing processes.

Flexographic printing precursors having laser-ablatable layers are described for example in U.S. Pat. No. 5,719,009 (Fan) where precursors include a laser-ablatable mask layer over one or more photosensitive layers. This publication teaches the use of a developer to remove unreacted material from the photosensitive layer, the barrier layer, and non-ablated portions of the mask layer.

There has been a desire in the industry for a way to prepare flexographic printing members without the use of photosensitive layers that are cured using UV or actinic radiation and that require liquid processing to remove non-imaged composition and mask layers and that generate significant amount of liquid waste. Direct laser engraving of precursors to produce relief printing plates and stamps is known, but the need for relief image depths greater than 500 µm creates a considerable challenge when imaging speed is also an important commercial requirement. In contrast to laser ablation of mask layers that require low to moderate energy lasers and fluence, direct engraving of a relief-forming layer requires much higher energy and fluence. A laser-engraveable layer must also exhibit appropriate physical and chemical properties to achieve "clean" and rapid laser engraving (high sensitivity) so that the resulting printed images have excellent resolution and durability.

A number of elastomeric systems have been described for construction of laser-engraveable flexographic printing precursors. For example, U.S. Pat. No. 6,223,655 (Shanbaum et al.) describes the use of a mixture of epoxidized natural rubber and natural rubber in a laser-engraveable composition. Engraving of a rubber is also described by S. E. Nielsen in *Polymer Testing* 3 (1983) pp. 303-310.

U.S. Pat. No. 4,934,267 (Hashimito) describes the use of a natural or synthetic rubber, or mixtures of both, such as acrylonitrile-butadiene, styrene-butadiene and chloroprene rubbers, on a textile support. "Laser Engraving of Rubbers—The Influence of Fillers" by W.Kern et al., October 1997, pp. 710-715 (Rohstoffe Und Anwendendunghen) describes the use of natural rubber, nitrile rubber (NBR), ethylene-propylene-diene terpolymer (EPDM), and styrene-butadiene copolymer (SBR) for laser engraving.

U.S. Pat. No. 5,798,202 (Cushner et al.) describes the use of reinforced block copolymers incorporating carbon black in a layer that is UV cured and remains thermoplastic. Such block copolymers are used in many commercial UV-sensitive flexographic printing plate precursors. As pointed out in U.S. Pat. No. 6,935,236 (Hiller et al.), such curing would be defective due to the high absorption of UV as it traverses through the thick imageable layer. Although many polymers are suggested for this use in the literature, only extremely flexible elastomers have been used commercially because flexographic layers that are many millimeters thick must be designed to be bent around a printing cylinder and secured with temporary bonding tape and both must be removable after printing.

U.S. Pat. No. 6,776,095 (Telser et al.) describes elastomers including an EPDM rubber and U.S. Pat. No. 6,913,869 (Leinenbach et al.) describes the use of an EPDM rubber for the production of flexographic printing plates having a flexible metal support. U.S. Pat. No. 7,223,524 (Hiller et al.) describes the use of a natural rubber with highly conductive carbon blacks. U.S. Pat. No. 7,290,487 (Hiller et al.) lists suitable hydrophobic elastomers with inert plasticizers.

An increased need for higher quality flexographic printing precursors for laser engraving has highlighted the need to solve performance problems that were of less importance when quality demands were less stringent. However, it has been especially difficult to simultaneously improve the flexographic printing precursor in various properties because a change that can solve one problem can worsen or cause another problem.

For example, the rate of imaging, edge sharpness, and cleanliness of the laser-engraved image features are now important considerations in laser engraving of flexographic printing precursors and can be critical parameters for high resolution printing performance. Although U.S. Pat. No. 7,290,487 (Hiller et al.) describes the use of hydrophobic elastomers for laser-engraving, such elastomers may be incompatible with many radiation-absorbers, providing defective engraved features. There remains a need to provide a laser-engraveable composition that provides sharp defect-free engraved image features.

Direct laser engraving has also been used to pattern various surfaces as described in U.S. Patent Application Publication 2011/0086204 (Wohl, Jr. et al.).

There is an increasing need to control the wetting properties of the laser-engraveable elements to enable controlled ink wetting of the laser-engraved elements and controlled ink separation and deposition from the laser-engraved element to suitable receiver materials.

U.S. Patent 2010/0151387 describes the use of adding low molecular weight fluorinated acrylates or methacrylates to a photosensitive printing plate to modify the wetting properties of the plate. However, these polymers do not provide for the performance properties required for a laser-engraveable printing element with differentiated ink wetting and release properties.

There continues to be a need to improve the sensitivity, manufacturability, and performance of laser-engraveable flexographic printing precursors (or other patternable elements) using laser-engraveable compositions having suitable physical and chemical properties. There is a desire to improve sensitivity, to improve selectivity of ink wetting and transfer, to reduce imaging time, and to increase the throughput of an imaging engraving apparatus. Also, there is a desire to achieve flexographic printing plate or other patternable elements that will provide relief images with good quality solid areas and dot reproduction even when printing is performed at high speeds.

SUMMARY OF THE INVENTION

This invention provides a composition comprising:
1) a fluoropolymer (such as an elastomeric fluoropolymer), and
2) at least 1 weight % of a fluoro-functionalized near-infrared radiation absorber, based on the total dry composition weight.

In some embodiments, a composition of this invention comprises:
1) an elastomeric perfluoropolyether in an amount of at least 30 weight % and up to and including 99 weight %,
2) at least 1 weight % and up to and including 35 weight % of a fluoro-functionalized carbon black, based on the total dry composition weight, and
3) one or more of microspheres and inorganic solid or porous particles, in an amount of up to and including 50 weight %, based on total dry composition weight,
wherein the weight ratio of the elastomeric perfluoropolyether to the fluoro-functionalized carbon black is from 19:1 to and including 4:1.

In addition, this invention provides a reactive fluoropolymer composition comprising a reactive fluoropolymer, a fluoro-functionalized near-infrared radiation absorber, and a compound that causes crosslinking of the reactive fluoropolymer during thermal curing.

This invention further provides a method for providing a laser-engraveable composition, comprising:
combining a reactive fluoropolymer, a fluoro-functionalized near-infrared radiation absorber, and a compound that causes crosslinking of the reactive fluoropolymer during thermal curing, to form a reactive fluoropolymer composition, and
thermally curing the reactive fluoropolymer composition to provide a laser-engraveable composition comprising a fluoropolymer (such as an elastomeric fluoropolymer) and the near-infrared radiation absorber.

The present invention provides laser-engraveable compositions and methods of making these compositions, which can be used in laser-engraveable elements to provide relief images for a variety of purposes. For example, these laser-engraveable elements can be designed for use as flexographic printing precursors. However, they can also be patternable articles to form patterned conductive articles that can be incorporated into display devices, optical devices, solar panels, or electronic devices.

The laser-engraveable compositions of this invention provide several advantages. For example, the fluoropolymer used to make the laser-engraveable layer is mixed with a fluoro-functionalized near-infrared radiation absorber (such as fluoro-functionalized carbon black) that is well dispersed within the fluoropolymer to provide more uniform laser engraving. Elastomeric fluoropolymers are particularly useful in the practice of this invention.

Furthermore, the low surface energy of the laser-engraveable layer formed using the composition of this invention has properties such as selective wetting and de-wetting of inks and solvent resistance. Moreover, the laser-engraveable layer can repel both hydrophobic and hydrophilic molecules (this property is sometimes known as "amphiphobicity"). This property can affect printing applications where wetting behavior and other surface characteristics are important for printing performance and properties.

DETAILED DESCRIPTION OF THE INVENTION

Definitions

As used herein to define various components of the laser-engraveable compositions and formulations, reactive fluoropolymer compositions, non-laser-engraveable compositions and layers, unless otherwise indicated, the singular forms "a", "an", and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered to be approximations as though the minimum and maximum values within the stated ranges were both preceded by the word "about". In this manner, slight variations above and below the stated ranges can be used to achieve substantially the same results as the values within the ranges. In addition, the disclosure of these ranges is intended as a continuous range including every value between the minimum and maximum values.

Moreover, unless otherwise indicated, percentages refer to percents by total dry weight, for example, weight % based on total solids of a layer, composition, or formulation. Unless otherwise indicated, the percentages can be the same for either the dry layer or the total solids of a formulation or composition used to make a layer.

In some embodiments, the term "imaging" refers to ablation of the background areas while leaving intact the areas of the laser-engraveable element that can be inked up and printed using a suitable ink, such as in flexographic printing members.

Alternatively the term "imaging" refers to ablation of the image areas that can be inked up using a suitable ink (for printing) while leaving intact the areas of the laser-engraveable element that will not be printed, such as in gravure or intaglio printing members.

The term "flexographic printing precursor" refers to some embodiments of a non-imaged laser-engraveable element described herein. The flexographic printing precursors include flexographic printing plate precursors, flexographic printing sleeve precursors, and flexographic printing cylinder precursors, all of which can be directly laser-engraved to provide a relief image using a laser to have a minimum relief depth of at least 10 μm and up to and including 4000 μm, or at least 50 μm to and including 3000 μm. Such directly laser-engraveable, relief-forming precursors can also be known as "flexographic printing plate blanks", "flexographic printing cylinders", or "flexographic sleeve blanks". The laser-engraveable flexographic printing precursors can also have seamless or continuous forms.

The term "laser-engraveable" means that the laser-engraveable (or imageable) layer can be directly imaged using a suitable laser-engraving source including infrared radiation lasers, for example carbon dioxide lasers and near-infrared radiation lasers such as Nd:YAG lasers, laser diodes, and fiber lasers. Absorption of energy from these lasers produces heat that causes rapid local changes in the laser-engraveable layer so that the imaged regions are physically detached from the rest of the layer or substrate and ejected from the layer and collected using suitable means. Non-imaged regions of the laser-engraveable layer are not removed or volatilized to an appreciable extent and thus form the upper surface of the relief image that is the element printing surface for flexographic printing, for example, or non-printing surface for gravure or intaglio printing, for example. The breakdown is a violent process that includes eruptions, explosions, tearing, decomposition, fragmentation, oxidation, or other destructive processes that create a broad collection of solid debris and gases. This is distinguishable from, for example, image transfer. "Laser-ablative" and "laser-engraveable" can be used interchangeably in the art, but for purposes of this invention, the term "laser-engraveable" is used to define the imaging according to the present invention in which a relief image is formed in the laser-engraveable layer. It is distinguishable from image transfer methods in which ablation is used to materially transfer pigments, colorants, or other image-forming components. As used herein "direct" laser engraving of the relief-forming layer is distinguished from laser ablation of a thin layer to create a mask that is used to control the application of curing radiation to underlying layers and is removed prior to printing.

Unless otherwise indicated, the terms "laser-engraveable composition" and "laser-engraveable layer formulation" are intended to be the same.

The "top surface" is equivalent to the "relief-image forming surface" and is defined as the outermost surface of the laser-engraveable element and is generally the first surface that is struck by imaging (engraving) radiation during the laser-engraving process. The "bottom surface" is defined as the surface of the laser-engraveable element that is most distant from the imaging radiation.

The term "elastomeric fluoropolymer" refers to fluoropolymers that generally regain their original shape after being stretched or compressed when the forces are removed. Generally, an elastomeric material is an amorphous polymer existing above its glass transition temperature at ambient or use temperatures. Typically, these polymers are crosslinked, either physically or chemically, and have high elasticity.

Uses

The laser-engraveable compositions of this invention can be used in many ways. The most likely use is to form flexographic printing precursors as described herein. However, while the following disclosure is directed primarily to flexographic printing precursors, it is to be understood that the present invention is not so limited. For example, the laser-engraveable elements can also be used to provide relief images for gravure printing, intaglio printing, or relief images or patterns for optical devices, electronic devices, display devices, or medical devices.

Flexographic Printing Precursors

The flexographic printing precursors are laser-engraveable to provide a desired relief image, and comprise at least one laser-engraveable layer that is formed from a laser-engraveable composition of this invention that comprises one or more fluoropolymers (such as elastomeric fluoropolymers) in a total amount of generally at least 30 weight % and up to and including 99 weight %, and more typically at least 50 weight % and up to and including 95 weight %, based on the total dry laser-engraveable composition or layer weight. The fluoropolymers are generally crosslinked, meaning that they have been polymerized or crosslinked during thermal curing (described below).

The elastomeric fluoropolymers useful in this invention generally have a glass transition temperature ($T_g$) of less than 0° C. and typically at least −100° C. and up to and including 0° C.

The elastomeric fluoropolymers can be prepared using various reactive fluoropolymers as described below. Examples of useful reactive fluoropolymers include but not limited to, poly(tetrafluoroethylene oxide-co-difluoromethylene oxide) α,ω-diol bis(2,3-dihydroxypropyl ether), poly (tetrafluoroethylene oxide-co-dilfluoromethylene oxide) α,ω-diol, and ethoxylated poly(tetrafluoroethylene oxide-co-difluoromethylene oxide) α,ω-diol, or the meth(acrylate) end-functionalized derivatives of the above compounds, but many others would be possible using the various reactive fluoropolymers and compounds that cause crosslinking of the reactive fluoropolymers.

The reactive fluoropolymers useful in this invention generally have number average molecular weights ($M_n$) greater than 1000 g/mol and up to about 100,000 g/mol.

Other examples of useful elastomeric fluoropolymers include fluorocarbon rubbers and fluorosilicone rubbers.

Examples of useful non-elastomeric fluoropolymers include but are not limited to, homopolymers and copolymers derived from one or more of vinylidene fluoride, vinyl fluoride, tetrafluoroethylene, chlorotrifluoroethylene, perfluoroalkyl vinyl ethers, and hexafluoropropylene monomers and polymers containing trifluoromethyl groups. Examples of these include but are not limited to, polytetrafluoroethylene, polytetrafluoroethylene copolymers, polychlorotrifluoroethylene and polychlorotrifluoroethylene copolymers, perfluoroalkoxy polymers and perfluoroalkoxy copolymers, polyhexafluoropropylene and hexafluoropropylene copolymers, poly(vinyl fluoride) and poly(vinyl fluoride) copolymers such as those listed under the trademark Kynar®, poly(vinylidene fluoride) homo- and co-polymers, polyperfluorosulfonates, fluorinated polyacrylates, fluorinated polymethacrylates, fluorinated polystyrenes, fluorinated polyamides, fluorinated polyimides, fluorinated polyurethanes, and fluorinated epoxides, and mixtures of any of these.

Although it is understood from this disclosure that laser-engraveable elastomeric fluoropolymer compositions of this invention are useful for flexible printing applications such as for flexographic printing, glassy or hard laser-engraveable (non-elastomeric) fluoropolymer compositions can be used for alternate printing or patterning applications and for surface energy control of the patterned printing members.

The laser-engraveable composition or layer also comprises at least 1 weight % and up to and including 35 weight %, or typically at least 5 weight % and up to and including 20 weight %, of one or more fluoro-functionalized near-infrared radiation absorbers (such as a fluoro-functionalized carbon black), based on the total dry laser-engraveable composition or layer weight. The fluoro-functionalized near-infrared radiation absorber is generally uniformly dispersed within the laser-engraveable composition.

These fluoro-functionalized near-IR, or IR radiation absorbers facilitate or enhance laser engraving, and the fluoro-functionalized near-infrared radiation absorbers have significant (perhaps maximum) absorption at wavelengths of at least 700 nm and higher in what is known as the infrared portion of the electromagnetic spectrum. In particularly useful embodiments, the fluoro-functionalized near-infrared radiation absorber has a $\lambda_{max}$ in the near-infrared portion of the electromagnetic spectrum having a $\lambda_{max}$ of at least 700 nm or at least 750 nm and up to and including 1400 nm. In particularly useful embodiments, the fluoro-functionalized near-infrared radiation absorber has an essentially panchromic absorption behavior that includes absorption in the near-infrared portion of the electromagnetic spectrum. Mixtures of fluoro-functionalized near-infrared radiation absorbers and mixtures of fluoro-functionalized near-infrared radiation absorbers with non-fluoro-functionalized near-infrared radiation absorbers can be used if desired, and the individual materials can have the same or different absorption spectra. The absorbance of the fluoro-functionalized near-infrared radiation absorber can be matched to the particular laser-engraving radiation that is to be used.

Such fluoro-functionalized near-infrared radiation absorbers can be a fluoro-functionalized carbon black, fluoro-functionalized carbon nanotube, fluoro-functionalized graphene, or fluoro-functionalized dye, or mixtures or combinations of any of these materials. Such materials can be purchased from various commercial sources such as Cabot Corporation (Boston, Mass.), or prepared using known procedures and commercially available starting materials. For example, fluoro-functionalized carbon blacks can be prepared by the reaction of fluoro-substituted aryl diazonium salts with commercially available carbon blacks using known methods as described for example in U.S. Pat. No. 5,554,739 (Belmont) and U.S. Pat. No. 6,399,202 (Yu et al.).

Thus, in some embodiments, the fluoropolymer (such as an elastomeric fluoropolymer) and the fluoro-functionalized near-infrared radiation absorber can be the only two essential components for providing a laser-engraveable composition or laser-engraveable layer. However, the laser-engraveable composition used to prepare the laser-engraveable layer can include residual, but generally non-functional, amounts of the compounds that provide crosslinking during thermal curing of the reactive fluoropolymers (described below).

The weight ratio of the fluoropolymer (such as an elastomeric fluoropolymer) to the fluoro-functionalized near-infrared absorber in the laser-engraveable composition or layer is generally from 99:1 to and including 1.4:1, or typically from 19:1 to and including 4:1.

In some embodiments, the laser-engraveable composition or layer can optionally include up to 50 weight %, based on the total dry composition or layer weight of additional materials selected from the group consisting of hollow, solid, or porous particles, surfactants, plasticizers, lubricants, and microspheres. Such materials include elastomeric or non-elastomeric resins that are not fluoropolymers including but not limited to, commercial rubbers such as EPDM, SBR, NBR, commercial thermoplastic elastomers, such as Kraton™ SBS, SEBS, SIS products, copolymers of styrene and butadiene, copolymers of isoprene and styrene, styrene-butadiene-styrene block copolymers, styrene-isoprene-styrene copolymers, other polybutadiene or polyisoprene elastomers, nitrile elastomers, polychloroprene, polyisobutylene and other butyl elastomers, elastomers containing chlorosulfonated polyethylene, polysulfide, polyalkylene oxides, or polyphosphazenes, elastomeric polymers of (meth)acrylates, elastomeric polyesters, and other similar polymers known in the art. Still other useful elastomeric resins include vulcanized rubbers, such as Nitrile (Buna-N), Natural rubber, Neoprene or chloroprene rubber, silicone rubber, SBR (styrene-butadiene rubber), NBR (acrylonitrile-butadiene rubber), ethylene-propylene rubber, and butyl rubber.

Other optional resins are non-elastomeric resins including but not limited to, thermosetting or thermoplastic urethane resins that are derived from the reaction of a polyol (such as polymeric diol or triol) with a polyisocyanate or the reaction of a polyamine with a polyisocyanate, styrenic polymers, acrylate and methacrylate polymers and copolymers, olefinic polymers and copolymers, and epoxide polymers.

It is understood that the mixture of the fluoropolymer and other optional elastomeric or non-elastomeric resins must form a compatible mixture. A particularly useful "compatible" mixture would be one wherein the elastomeric resin(s) form isolated phase separated domains with average dimensions from 0.01 µm to and including 10 µm in diameter within the fluoropolymer.

It is also possible that the fluoro-functionalized near-infrared radiation absorber is dispersed non-uniformly within the laser-engraveable layer, and being present in a concentration that is greater near the bottom surface of the laser-engraveable layer than the top surface. This concentration profile can provide a laser energy absorption profile as the depth into the laser-engraveable layer increases. In some instances, the concentration changes continuously and generally uniformly with depth. In other instances, the concentration is varied with layer depth in a step-wise manner. Further details of such arrangements are provided in U.S. Pat. No. 8,114,572 (Landry-Coltrain et al.) that is incorporated herein by reference.

The laser-engraveable composition or layer can optionally include organic or inorganic filler materials selected from the group consisting of hollow, solid, or porous particles, surfactants, and microspheres. Useful inorganic fillers and other particles include but not limited to, various aluminas or silicas (treated, fumed, or untreated), calcium carbonate, magnesium oxide, talc, barium sulfate, kaolin, bentonite, hallosite and other clays, zinc oxide, zirconium oxide, mica, titanium dioxide, and mixtures thereof. Particularly useful inorganic fillers are silica, calcium carbonate, and alumina, including fine particulate silica, fumed silica, porous silica, surface treated silica, sold as Aerosil® from Degussa, Utrasil® from Evonik, and Cab-O-Sil® from Cabot Corporation, micropowders such as amorphous magnesium silicate cosmetic microspheres sold by Cabot and 3M Corporation, calcium carbonate and barium sulfate particles and microparticles, zinc oxide, and titanium dioxide, or mixtures of two or more of these materials.

When present, the amount of the inorganic fillers in the laser-engraveable composition or layer is up to and including 50 weight %.

The laser-engraveable composition or layer can optionally comprise microcapsules that are dispersed generally uniformly within the laser-engraveable composition. These "microcapsules" can also be known as "hollow beads", "hollow spheres", "microspheres", microbubbles", "micro-balloons", "porous beads", or "porous particles". Some microcapsules include a thermoplastic polymeric outer shell and a core of either air or a volatile liquid such as isopentane or isobutane. The microcapsules can comprise a single center core or many voids (pores) within the core. The voids can be interconnected or non-connected. For example, microcapsules can be designed like those described in U.S. Pat. No. 4,060,032 (Evans) and 6,989,220 (Kanga) in which the shell is composed of a poly[vinylidene-(meth)acrylonitrile] resin or poly(vinylidene chloride), or as plastic micro-balloons as described for example in U.S. Pat. No. 6,090,529 (Gelbart) and U.S. Pat. No. 6,159,659 (Gelbart). Some useful microcapsules are the EXPANCEL® microspheres that are commercially available from Akzo Noble Industries (Duluth, Ga.), Dualite and Micropearl polymeric microspheres that are available from Pierce & Stevens Corporation (Buffalo, N.Y.), hollow plastic pigments that are available from Dow Chemical Company (Midland, Mich.), and the organic porous particles that are described in copending and commonly assigned U.S. Ser. Nos. 13/192,531 and 13/192,533, (both filed Jul. 28, 2011 by Landry-Coltrain and Nair).

Upon laser-engraving, the microspheres that are hollow or filled with an inert solvent, burst and give a foam-like structure or facilitate ablation of material from the laser-engraveable layer because they reduce the energy needed for ablation.

Other optional addenda in the laser-engraveable composition or layer can include but are not limited to, dyes, antioxidants, antiozonants, stabilizers, dispersing or processing aids, surfactants, waxes, lubricants, adhesion promoters, and plasticizers as long as they do not interfere with laser-engraving efficiency. Examples of plasticizers can include low molecular weight polyolefins, polyesters, and polyacrylates, fluorinated compounds (other than those described as essential components), silicone compounds, non-crosslinked liquid rubbers and oils, liquid ethylene-propylenes, liquid polybutylene, liquid polypropylene, or mixtures these materials.

The laser-engraveable layer incorporated into the laser-engraveable elements (such as flexographic printing precursors) has a dry thickness of at least 0.05 µm and up to and including 4,000 µm, or typically of at least 50 µm and up to and including 3,000 or at least 300 µm and up to and including 3,000 µm.

The total dry thickness of the entire laser-engraveable elements (such as flexographic printing precursors) is at least 300 µm and up to and including 6,000 µm or typically at least 1,000 µm and up to and including 3,000 µm. Flexographic printing sleeve precursors can generally have a laser-engraveable layer having a dry thickness of at least 2 mm and up to and including 20 mm. Flexographic printing cylinders can have a suitable laser-engraveable layer dry thickness.

Multiple layers of the laser-engraveable layer can be disposed one on top of the other in order to create a thicker composite laser-engraveable layer. These multiple laser-engraveable layers can be identical in composition or thickness, or they can differ in composition in that they contain differing amounts and types of components (for example, particulates, microcapsules, fluoro-functionalized near-infrared radiation absorbers, and fluoropolymers), or in thickness. For example, a laser-engraveable layer containing hollow microspheres or microbubbles can be disposed under an uppermost laser-engraveable layer that does not contain hollow microspheres. A skilled worker could design many different arrangements of such multiple laser-engraveable layers.

While a single laser-engraveable layer is present in most flexographic printing precursors, there can be multiple laser-engraveable layers formed from the same or different laser-engraveable compositions, such layers having the same or different fluoropolymers prepared from the same or different reactive fluoropolymers, and the same or different fluoro-functionalized near-infrared radiation absorbers. Thus, in some embodiments, there are two or more layers in the laser-engraveable element including at least one laser-engraveable layer according to this invention. For example, there can be an additional or second laser-engraveable layer that is contiguous to a first laser-engraveable layer, both of which laser-engraveable layers are prepared according to this invention and can be laser-engraved at the same or different times.

In other embodiments, a non-laser engraveable layer can be arranged contiguous to a single laser-engraveable layer.

In still other embodiments, a non-fluoropolymer-containing laser engraveable layer can be arranged contiguous to a fluoropolymer-containing laser-engraveable layer.

The laser-engraveable elements also include embodiments in which the laser-engraveable layer is a first laser-engraveable layer, and the laser-engraveable element further comprises a second layer-engraveable layer that is contiguous to the first laser-engraveable layer, wherein the second laser-engraveable layer is either a fluoropolymer-containing laser-engraveable layer according to the present invention or a non-fluoropolymer-containing laser-engraveable layer.

Other embodiments include alternating laser-engraveable layers and non-laser-engraveable layers, for example such as a sandwich of at least three layers, such as a first laser-engraveable layer, a non-laser-engraveable layer, and a second laser-engraveable layer. A skilled worker in the art could design any number of alternative arrangements of suitable layers as embodiments of the present invention.

In most embodiments, the laser-engraveable layer according to this invention is the outermost layer of the laser-engraveable elements, including embodiments where the laser-engraveable layer is disposed on a flexographic printing cylinder as a sleeve. However, in some embodiments, the laser-engraveable layer can be located underneath an outermost capping smoothing layer that provides additional smoothness or different ink reception and release. This smoothing layer can have a general dry thickness of at least 1 µm and up to and including 200 µm.

The flexographic printing precursors can optionally comprise an elastomeric rubber layer that is considered a "compressible" layer (also known as a cushioning layer) and is disposed over the substrate and under a laser-engraveable layer. In most embodiments, the compressible layer is disposed directly on the substrate and the laser-engraveable layer is disposed directly on the compressible layer. While the compressible layer can be non-laser-engraveable, in some embodiments, the compressible layer comprises one or more components that make it laser-engraveable.

The compressible layer can also have microvoids or microspheres dispersed within the one or more elastomeric rubbers. In most embodiments, the microvoids or microspheres are uniformly dispersed within the elastomeric rubbers. Useful microspheres are described above as "microcapsules", "hollow beads", "hollow spheres", microbubbles", "micro-balloons", "porous beads", or "porous particles", which are dispersed (generally uniformly) within the one or more elastomeric rubbers in the compressible layer. The compressible layer can also comprise other addenda such as filler materials and addenda described above for the laser-engraveable layer.

The dry thickness of the compressible layer is generally at least 50 μm and up to and including 4,000 μm, or typically at least 100 μm and up to and including 2,000 μm.

The laser-engraveable or patternable elements (such as flexographic printing precursors) described herein can have a suitable dimensionally stable, non-laser-engraveable substrate having an imaging side and a non-imaging side. The substrate has at least one laser-engraveable layer disposed over it on the imaging side of the substrate. Suitable substrates include dimensionally stable polymeric films, high temperature polymeric films, chemically resistant films, aluminum sheets or cylinders, transparent foams, ceramics, glasses, porous glasses, fabrics, or laminates of polymeric films (from condensation or addition polymers) and metal sheets such as a laminate of a polyester and aluminum sheet or polyester/polyamide laminates, or a laminate of a polyester film and a compliant or adhesive support. Polyester, polycarbonate, poly(vinyl chloride), and polystyrene films are typically used. Useful polyesters include but are not limited to poly(ethylene terephthalate) and poly(ethylene naphthalate). Other high temperature polymers useful as high temperature films include but are not limited to, polyetherimides, polyimides (such as Kapton™ films) PEEK (polyetheretherketone), polysulfone, polyethersulfone, polyphenylsulfone, and polyphenylenesulfide.

The substrates can have any suitable thickness, but generally they are at least 0.01 mm or at least 0.05 mm and up to and including 5 mm thick.

Some particularly useful substrates comprise one or more layers of a metal, fabric, or polymeric film, glass, porous glass, ceramic, or a combination thereof. For example, a fabric web can be applied to a polyester or aluminum support using a suitable adhesive. For example, the fabric web can have a thickness of at least 0.1 mm and up to and including 0.5 mm, and the polyester support thickness can be at least 100 μm and up to and including 200 μm or the aluminum support can have a thickness of at least 200 μm and up to and including 400 μm. For example, a glass substrate can have a thickness of at least 100 μm and up to and including 5 mm. The dry adhesive thickness can be at least 10 μm and up to and including 300 μm.

A thin conductive layer or film of, for example, poly(3,4-ethylenedioxythiophene) (PEDOT), polyacetylene, polyaniline, polypyrrole, or other polythiophenes, indium tin oxide (ITO), or graphene, can be disposed between the substrate and a laser engraveable layer.

There can be a non-laser-engraveable backcoat on the non-imaging side of the substrate that can comprise a soft rubber or foam, or other compliant layer. This non-laser-engraveable backcoat can provide adhesion between the substrate and printing press rollers and can provide extra compliance to the resulting laser-engraved member, or for example to reduce or control the curl of a resulting laser-engraved member. Alternatively, this backcoat can be laser-engraveable so as to provide the capability for writing specific information, product identification, classification, or other metadata.

The laser engraveable element or patternable element (such as a flexographic printing precursor) can be subjected to mechanical grinding by known methods in the art using commercially available machines such as belt grinders, cylindrical grinders using an abrasive wheel, or paper. Grinding can be done on either the top surface of the imaging side of the laser-engraveable element or the bottom surface of the laser-engraveable element, prior to the optional introduction of a support, in order to ensure thickness uniformity, or it can be done on the laser-engraveable surface to achieve a desired surface roughness that will improve ink wetting or transfer.

Preparation of Laser-Engraveable Elements (and Patternable Elements)

Preparation of the laser-engraveable elements (or patternable elements) is illustrated as follows with respect to flexographic printing precursors but other laser-engraveable elements and patternable elements can be similarly prepared.

One or more reactive fluoropolymers, one or more fluoro-functionalized near-infrared radiation absorbers (for example, the fluoro-functionalized carbon black, fluoro-functionalized carbon nanotubes, fluoro-functionalized graphene, or fluoro-functionalized dye, or a combination of any of these materials described above), and one or more compounds that cause crosslinking of the reactive fluoropolymer during thermal curing, and any optional materials (for example, one or more materials selected from the group consisting of hollow, solid, or porous particles, surfactants, plasticizers, lubricants, non-fluorinated resins, and microspheres as described above), are combined (mixed or formulated) to form a reactive fluoropolymer composition. Combining these components can be carried out by melt-mixing using any suitable mechanical mixing device known in the industry, such as for example a screw extruder, a Brabender mixer, a two-roll or a 3-roll mill. Alternatively, the noted components can be combined in a solvent and mixed using a mixer, or the dispersion can be sonicated, and cast, spray-coated, or otherwise coated onto a substrate or put into a mold, followed by evaporation of the solvent.

Thus, useful reactive fluoropolymer compositions of this invention comprise a fluoro-functionalized near-infrared radiation absorber that is a fluoro-functionalized carbon black that is present in an amount of at least 1 weight % and up to and including 35 weight %, based on the total dry reactive fluoropolymer composition weight.

Reactive fluoropolymers are compounds that are generally di-, tri-, or multi-functional compounds that include two or more reactive groups selected from the group consisting of reactive groups such as α, β-ethylenically unsaturated groups, hydroxy, carboxy, isocyanate, amine, thiol, carbonyl, alkene, vinyl, alkyne, epoxide, azide, boronic acid, and organic phosphates. Combinations of two or more of different reactive groups can be present in the same multifunctional molecule. In some embodiments, the reactive fluoropolymer is a multifunctional (meth)acrylate and the compound that causes crosslinking during thermal curing is a peroxide, azo compound, persulfate, or redox initiator.

To form the fluoropolymers (such as elastomeric fluoropolymers), the reactive fluoropolymers are reacted during thermal curing of the reactive fluoropolymer composition to cause polymerization or crosslinking, thereby forming the desired fluoropolymer (such as an elastomeric fluoropolymer). Thermal curing is facilitated using one or more reactive compounds that are chosen so that they are reactive with the reactive groups in the reactive fluoropolymer.

The reactive fluoropolymer composition comprises one or more compounds that cause crosslinking of the reactive fluoropolymer, for example when using a radical initiator, in an amount of at least 0.1 weight % and up to and including 5 weight %, and typically in an amount of at least 1 weight % and up to and including 2 weight %, based on total reactive fluoropolymer composition dry weight. Alternatively, for example, when using an isocyanate crosslinker to react with a diol or amine reactive fluoropolymer, the equivalent molar ratio of alcohol (or amine) groups and isocyanate groups would be about 1:1.

In some embodiments, the reactive fluoropolymer composition comprises a reactive fluoropolymer that is a multifunctional (meth)acrylate and a compound that causes crosslinking during thermal curing that is a peroxide, azo compound, persulfate, or redox initiator.

Thus, thermally curing the reactive fluoropolymer composition can provide a laser-engraveable composition comprising an elastomeric fluoropolymer having a glass transition temperature ($T_g$) of less than or equal to 0° C., and the fluoro-functionalized near-infrared radiation absorber described above.

Suitable thermal curing conditions can be used as one skilled in the art would know from the specific choice of reactive fluoropolymer (that is, the specific reactive groups) and a suitable compound that would facilitate the thermal curing. For example, thermal curing can be achieved using an infrared dryer or heating unit, an oven, a rotocure unit, or in-line heating devices. For example, thermally curing the reactive fluoropolymer composition can be carried out in an oven at a temperature of at least 60° C. for at least 60 minutes, or when using radical crosslinking, typically at a temperature of at least 70° C. and up to and including 90° C. for at least 30 minutes and up to and including 12 hours.

For example, if the reactive groups are vinyl groups (in acrylate or methacrylate moieties), the compounds used to cause thermal curing provide free radicals including but not limited to, peroxides or azo compounds such as benzoyl peroxide, tert-butyl peracetate, cumene hydroperoxide, cyclohexanone peroxide, dicumyl peroxide, lauroyl peroxide, 2,4-pentanedione peroxide, di(t-butylperoxyisopropyl)benzene, 2,5-dimethyl-2,5-bis(t-butyl) peroxy)hexane, bis (t-butylperoxy)-2,5-dimethyl-3-hexyne, t-butyl hydroperoxide, di(t-butyl) peroxide, n-butyl 4,4'-di(t-butylperoxy)valerate, 1,1-bis (t-butylperoxy)-cyclohexane, 1,1'-bis(t-butylperoxy)-3,3,5-trimethylcyclohexane, t-butyl cumyl peroxide, t-butyl peroxybenzoate, t-butyl peroxy-2-ethylhexyl carbonate, 2,2'-azobis(2-methylpropionitrile), 4,4-azobis(4-cyanovaleric acid), 1,1'-azobis(cyclohexanecarbonitrile), 2,2'-azobis(2-methylpropionamidine) dihydrochloride, persulfates, redox initiators, and any others that can react with carbon-carbon double bonds to produce the desired curing (or crosslinking) density. The term "peroxide" also includes "hydroperoxides". Many commercially available peroxides are supplied at 40-50% activity with the remainder of the commercial composition being inert silica or calcium carbonate particles. The peroxide vulcanizing compositions generally also comprise one or more co-reagents at a molar ratio to the total peroxides of from 1:6 to and including 25:1.

Vinyl groups can also be cured by metallocene catalysts, such as titanocene or zirconocene complexes. Vinyl groups can additionally be cured by anionic polymerization using initiators including but not limited to, sodium amide, lithium diethylamide, alkoxides, hydroxides, cyanides, phosphines, amines, alkyllithium compounds, and organomagnesium compounds.

Co-reagents hat are useful with peroxides include but are not limited to, triallyl cyanurate (TAC), triallyl isocyanurate, triallyl trimellitate, the esters of acrylic and methacrylic acids with polyvalent alcohols, trimethylolpropane trimethacrylate (TMPTMA), trimethylolpropane triacrylate (TMPTA), ethylene glycol dimethacrylate (EGDMA), and N,N'-m-phenylenedimaleimide (HVA-2, DuPont).

The continuous laser-engraveable layer (for example, on a fabric web with the compressible layer) can then be laminated (or adhered) to a suitable polymeric film such as a polyester film to provide the laser-engraveable layer on a substrate, for example, a fabric web adhered with an adhesive to the polyester film. The continuous laser-engraveable layer can be ground using a suitable grinding apparatus to provide a uniform smoothness and thickness in the continuous laser-engraveable layer. The smooth, uniformly thick laser-engraveable layer can then be cut to a desired size to provide suitable laser-engraveable elements such as flexographic printing precursors.

The process for making flexographic printing sleeves is similar but the compounded laser-engraveable layer composition can be applied or deposited around a printing sleeve core, and cured to form a continuous laser-engraveable flexographic printing sleeve precursor.

Similarly, a continuous calendered laser-engraveable layer on a fabric web can be deposited around a printing cylinder and cured to form a continuous flexographic printing cylinder precursor.

Various embodiments of laser-engraveable elements can be prepared by the method described herein. For example, the method can comprise:

forming the reactive fluoropolymer composition into a reactive fluoropolymer layer over a substrate, and thermally curing the reactive fluoropolymer layer to provide a laser-engraveable layer over the substrate. In many embodiments, the reactive fluoropolymer composition is formed directly on the substrate and then thermally cured. In other embodiments, there can be one or more layers between the substrate and the formed reactive fluoropolymer layer.

As noted above, useful substrates for these methods can be selected from the group consisting of a polymeric film, a fabric-containing web, a ceramic, a metal, and glass including flexible glass. Particularly useful substrates include fabric-containing webs, such as laminates of fabrics and polymeric films, to which the reactive fluoropolymer composition is applied prior to thermally curing it to form the laser-engraveable layer on the fabric-containing web.

In other embodiments, the method comprises forming a reactive fluoropolymer composition in a mold prior to thermally curing the reactive fluoropolymer composition to form a laser-engraveable layer in the mold.

In still other embodiments, the method comprises:

applying a non-laser-engraveable composition (as described above, for example, a compressible layer composition) over a substrate to form a non-laser-engraveable layer over the substrate, applying a reactive fluoropolymer composition to the non-laser-engraveable layer, and thermally curing the reactive fluoropolymer composition to form a laser-engraveable layer on the non-laser-engraveable layer.

If the laser-engraved element is designed to have two or more laser-engraveable layers, the method comprises:

applying a reactive fluoropolymer composition over a substrate, before or after applying the reactive fluoropolymer composition over the substrate, applying an additional reactive fluoropolymer composition over the substrate, wherein the reactive fluoropolymer composition and the additional reactive fluoropolymer composition have the same or different chemical composition, and thermally curing both the reactive fluoropolymer composition and the additional reactive fluoropolymer composition to form first and second laser-engraveable layers over the substrate.

This process can be repeated as many times as desired to form three or more laser-engraveable layers of this invention over the substrate, which laser-engraveable layers can be contiguous, or any two laser-engraveable layers of this invention can be separated by intermediate layers that are either laser-engraveable or not laser-engraveable, but which intermediate layers do not contain a fluoropolymer.

Laser-Engraving for Imaging

Laser engraving can be accomplished using a near-IR radiation emitting diode or carbon dioxide or Nd:YAG laser. It is desired to laser engrave the laser-engraveable layer to provide a relief image with a minimum relief image depth of at least 10 µm and up to and including 4,000 µm, or of at least 50 µm and up to and including 1,000 µm. For flexographic printing members, more likely, the minimum relief image depth is at least 300 µm and up to and including 4,000 µm or up to and including 1,000 µm being desirable. "Relief floor depth" is defined as the difference measured between the floor (lowest engraved areas) of the laser-engraved element and its outermost printing surface. It is to be understood that the relief image depth between image features (relief image depth, which is defined as the difference measured between the bottom of a specific laser-engraved area and its outermost printing surface) that are closely spaced will be less than the relief floor depth. The floor of the relief image can be the substrate if all layers are completely removed in the imaged regions. A semiconductor near-infrared radiation laser or one or more (array) of such lasers operating at a wavelength of at least 700 nm and up to and including 1400 nm can be used, and a diode laser operating at from 800 nm to 1250 nm is particularly useful for laser-engraving.

Generally, laser-engraving is achieved using at least one near-infrared radiation laser having a minimum fluence level of at least 1 J/cm$^2$ at the element topmost and typically near-infrared imaging fluence is at least 20 J/cm$^2$ and up to and including 1,000 J/cm$^2$ or typically at least 50 J/cm$^2$ and up to and including 800 J/cm$^2$.

For example, laser-engraving can be carried out using a diode laser, an array of diode lasers connected with fiber optics, a Nd-YAG laser, a fiber laser, a carbon dioxide gas laser, or a semiconductor laser. Such instruments and conditions for their use are well known in the art and readily available from a number of commercial sources. Detailed descriptions can be found in U.S. Patent Application Publications 2010/0068470A1 (Sugasaki), 2008/018943A1 (Eyal et al.), and 2011/0014573A1 (Matzner et al.), all hereby incorporated by reference.

A suitable laser engraver that would provide satisfactory engraving is described in WO 2007/149208 (Eyal et al.) that is incorporated herein by reference. This laser engraver is considered to be a "high powered" laser ablating imager or engraver and has at least two laser diodes emitting radiation in one or more near-infrared radiation wavelengths so that imaging with the one or more near-infrared radiation wavelengths is carried out at the same or different depths relative to the outer surface of the laser-engraveable layer. For example, the multi-beam optical head described in the noted publication incorporates numerous laser diodes, each laser diode having a power in the order of at least 5-10 Watts per emitter width of 100 µm. These lasers can be modulated directly at relatively high frequencies without the need for external modulators.

Thus, laser-engraving (laser imaging) can be carried out at the same or different relief image depths relative to the outer surface of the laser-engraveable layer using two or more laser diodes, each laser diode emitting near-infrared radiation in one or more wavelengths.

Other imaging (or engraving) devices and components thereof and methods are described for example in U.S. Patent Application Publications 2008/0153038 (Siman-Tov et al.) describing a hybrid optical head for direct engraving, 2008/0305436 (Shishkin) describing a method of imaging one or more graphical pieces in a flexographic printing plate precursor on a drum, 2009/0057268 (Aviel) describing imaging devices with at least two laser sources and mirrors or prisms put in front of the laser sources to alter the optical laser paths, and 2009/0101034 (Aviel) describing an apparatus for providing an uniform imaging surface, all of which publications are incorporated herein by reference. In addition, U.S. Patent Application Publication 2011/0014573 (Matzner et al.) describes an engraving system including an optical imaging head, a printing plate construction, and a source of imaging near-infrared radiation, which publication is incorporated herein by reference. U.S. Patent Application Publication 2011/0058010 (Aviel et al.) describes an imaging head for 3D imaging of flexographic printing plate precursors using multiple lasers, which publication is also incorporated herein by reference.

Engraving to form a relief image can occur in various contexts. For example, the laser-engraved elements can have a relief image having a minimum relief image depth of at least 10 µm, and the relief image layer comprises a fluoropolymer (such as an elastomeric fluoropolymer) as described above, and at least 1 weight % of a fluoro-functionalized near-infrared radiation absorber (as described above), based on the total dry relief image layer weight. This relief image layer can be disposed over a substrate (such as polymeric film, a fabric-containing web, a ceramic, a metal, and glasses such as flexible glasses). For example, sheet-like elements can be imaged and used as desired, or wrapped around a printing sleeve core or cylinder form before imaging. The laser-engraved elements having a relief image layer can be flexographic printing plates, flexographic printing sleeves, or flexographic printing cylinders.

During imaging, products from the engraving can be gaseous or volatile and readily collected by vacuum for disposal or chemical treatment. Any solid debris from engraving can be collected and removed using suitable means such as vacuum, compressed air, brushing with brushes, rinsing with water, blotting with an absorbent material, ultrasound, or any combination of these.

During printing, the resulting flexographic printing plate, laser-engraved element, or patterned element, flexographic printing cylinder, or printing sleeve is typically inked using known methods and the ink is appropriately transferred to a suitable receiver material such as papers, plastics, fabrics, paperboard, metals, particle board, wall board, glass, glass-coated substrates, ceramics, or cardboard.

After printing, the laser-engraved element can be cleaned and reused in a suitable manner and reused as needed. Cleaning can be accomplished with compressed air, water, or a suitable aqueous or organic solution, or by rubbing with cleaning brushes or pads. Surfactants or soaps can be added to the aqueous or organic solutions to accelerate cleaning.

Other laser-engraved elements can be used to apply ink patterns to various substrates using a suitable pattern-forming material (or ink) such as a flexographic printing ink, an electrically conductive ink (such as a silver-containing ink, nickel-containing ink, or copper-containing ink, or metal salts or metal precursors, such as silver salts), a seed or catalyst or growth agent, or a biological agent-containing ink. In the context of this invention, the term "ink" is to be understood to broadly refer to a substance or fluid that can be "printed" or applied to a receiver material of any type using the laser-engraved element. A skilled artisan would be able to apply the present invention to various printing technologies using suitable inks to provide desired patterns (for example, conductive patterns), grids, or raised surfaces that "correspond" to the relief image in the laser-engraved element.

In some embodiments, the laser-engraved element can be have a relief image layer comprising a predetermined pattern of relief lines, each line having an average width of at least 1 µm and up to and including 10 mm. Such lines can also have an average height of at least 10 µm and up to and including 4,000 µm. These average dimensions can be determined by measuring the lines in at least 10 places and determining the width or height using known image analysis tools including but not limited to, profilometry, optical microscopic techniques, atomic force microscopy, and scanning electron microscopy.

The present invention provides at least the following embodiments and combinations thereof, but other combinations of features are considered to be within the present invention as a skilled artisan would appreciate from the teaching of this disclosure:

1. A composition comprising:
   1) a fluoropolymer, and
   2) at least 1 weight % of a fluoro-functionalized near-infrared radiation absorber, based on the total dry composition weight.

2. The composition of embodiment 1, wherein the fluoro-functionalized near-infrared radiation absorber is a fluoro-functionalized carbon black, fluoro-functionalized carbon nanotube, fluoro-functionalized graphene, or fluoro-functionalized dye, or a mixture or combination of any of these materials.

3. The composition of embodiment 1 or 2, wherein the fluoro-functionalized near-infrared radiation absorber is a fluoro-functionalized carbon black that is present in an amount of at least 1 weight % and up to and including 35 weight %, based on the total dry composition weight.

4. The composition of any of embodiments 1 to 3, wherein the fluoropolymer is present in an amount of at least 30 weight % and up to and including 99 weight %, based on the total dry composition weight.

5. The composition of any of embodiments 1 to 4, wherein the fluoropolymer is an elastomeric fluoropolymer.

6. The composition of embodiment 5, wherein the elastomeric fluoropolymer has a glass transition temperature ($T_g$) of less than or equal to 0° C.

7. The composition of any of embodiments 1 to 6, wherein the fluoropolymer is an elastomeric perfluoropolyether.

8. The composition of any of embodiments 1 to 7 consisting essentially of the fluoropolymer that is an elastomeric fluoropolymer and the fluoro-functionalized near-infrared radiation absorber.

9. The composition of any of embodiments 1 to 8, further comprising one or more materials selected from the group consisting of hollow, solid, or porous particles, surfactants, plasticizers, lubricants, non-fluorinated resins, and microspheres.

10. The composition of embodiment 9, wherein the one or more materials are present in the composition in an amount of up to and including 50 weight %, based on total dry composition weight.

11. The composition of any of embodiments 1 to 10, wherein the weight ratio of the fluoropolymer to the fluoro-functionalized near-infrared absorber is from 99:1 to and including 1.4:1.

12. A reactive fluoropolymer composition comprising a reactive fluoropolymer, a fluoro-functionalized near-infrared radiation absorber, and a compound that causes crosslinking of the reactive fluoropolymer during thermal curing.

13. The reactive fluoropolymer composition of embodiment 12, wherein the fluoro-functionalized near-infrared radiation absorber is a fluoro-functionalized carbon black, fluoro-functionalized carbon nanotube, fluoro-functionalized graphene, or fluoro-functionalized dye, or a mixture or combination of any of these materials.

14. The reactive fluoropolymer composition of embodiment 12 or 13, wherein the fluoro-functionalized near-infrared radiation absorber is a fluoro-functionalized carbon black that is present in an amount of at least 1 weight % and up to and including 35 weight %, based on the total dry composition weight.

15. The reactive fluoropolymer composition of any of embodiments 12 to 14, further comprising one or more materials selected from the group consisting of hollow, solid, or porous particles, surfactants, plasticizers, lubricants, non-fluorinated resins, and microspheres.

16. The reactive fluoropolymer composition of any of embodiments 12 to 15, wherein the reactive fluoropolymer comprises one or more reactive groups selected from the group consisting of $\alpha,\beta$-ethylenically unsaturated groups, hydroxy, carboxy, isocyanate, (meth)acrylate, amine, thiol, carbonyl, alkene, alkyne, epoxide, azide, boronic acid, and organic phosphate groups.

17. The reactive fluoropolymer composition of any of embodiments 12 to 16, wherein the reactive fluoropolymer has a number average molecular weight of at least 1000 g/mol.

18. The reactive fluoropolymer composition of any of embodiments 12 to 17, wherein the compound that causes crosslinking of the reactive fluoropolymer is present in an amount of at least 0.1 weight % and up to and including 5 weight %.

19. The reactive composition of any of embodiments 12 to 18, wherein the reactive fluoropolymer is a multifunctional (meth)acrylate and the compound that causes crosslinking during thermal curing is a peroxide, azo compound, persulfate, or redox initiator.

20. A method for providing a laser-engraveable composition, comprising:
   combining a reactive fluoropolymer, a fluoro-functionalized near-infrared radiation absorber, and a compound that causes crosslinking of the reactive fluoropolymer during thermal curing, to form a reactive fluoropolymer composition of any of embodiments 12 to 19, and
   thermally curing the reactive fluoropolymer composition to provide a laser-engraveable composition comprising a fluoropolymer and the fluoro-functionalized near-infrared radiation absorber.

21. The method of embodiment 20, wherein thermally curing the reactive fluoropolymer composition provides a laser-engraveable composition comprising an elastomeric fluoropolymer having a glass transition temperature ($T_g$) of less than or equal to 0° C., and the fluoro-functionalized near-infrared radiation absorber.

22. The method of embodiment 20 or 21, wherein the reactive fluoropolymer is a multifunctional (meth)acrylate and the compound that causes crosslinking during thermal curing is a peroxide, azo compound, persulfate, or redox initiator.

The following Examples are provided to illustrate the practice of this invention and are not meant to be limiting in any manner.

The following materials, 2,2'-azobis(2-methylpropionitrile) (AIBN), chloroform, 2-isocyanatoethyl methacrylate, 1,1,2-trichloro,-1,2,2-trifluoroethane, dibutyltin dilaurate (DBTDL), and poly(tetrafluoroethylene oxide-co-difluoromethylene oxide) $\alpha,\omega$-diol, were purchased from Sigma-Aldrich Chemical Co. and used as received.

Preparation of Reactive Fluoropolymer:

A perfluoropolyether bisurethane methacrylate oligomer was prepared as follows:

Poly(tetrafluoroethylene oxide-co-difluoromethylene oxide) α,ω-diol (34.6 g, 0.009 mol), 2-isocyanatoethyl methacrylate (2.82 g, 0.018 mol), and DBTDL (7 drops) were dissolved in 1,1,2-trichloro,-1,2,2-trifluoroethane (10 ml) and heated to 50° C. for 24 hours. The resulting oligomer was then passed through a short column of basic alumina, concentrated, and placed under vacuum to dry which yielded a dry pale yellow solid (34.3 g, 99% yield).

Preparation of Fluoro-functionalized Near-Infrared Radiation Absorber:

Carbon black (10 g of Cabot R330A67) was added to 100 ml of water and stirred using a Cowles-type blade powered by an overhead shaft-driven motor operating at 500 rpm to form a carbon black slurry. Mixing was continued for 1 hour. Meanwhile, a solution of 3-trifluoromethylbenzene diazonium chloride was prepared by dissolving 0.64 g (0.004 mol) of m-trifluoromethyl-aniline in 10 ml of water containing 1.5 ml of concentrated HCl, chilling the solution to less than about 10° C. using an ice bath, and then adding 0.3 g (0.0043 mol) of sodium nitrite in 5 ml of water. The resulting mixture was stirred cold for 30 minutes and 30 mg of urea were added to decompose any excess nitrous acid. The resulting solution was added to the carbon black slurry and stirring was continued at ambient temperature for about 3 hours. Some gas evolution was noted.

The fluoro-functionalized carbon black product was collected by filtration through a fine glass frit funnel, and rinsed with several 50-100 ml portions of water followed by about 25 ml of methanol. After the resulting solid had dried, it was transferred to a Soxhlet thimble and extracted using hot acetone for 4 hours. The purified carbon black product was dried at 50° C. under vacuum to yield 10.1 g of product.

The fluoro-functionalized carbon black product was dry ground using a Tekmar-type blade mill for about 1 minute in order to break up any larger clumps.

INVENTION EXAMPLE E1

Perfluoropolyether bisurethane methacrylate oligomer (1.69 g) was sonicated with the fluoro-functionalized carbon black product described above (0.085 g) as described in U.S. Pat. No. 6,399,202 (Yu et al.). AIBN (0.02 g, 1.2 weight %) was dissolved in chloroform (3-4 drops) and immediately added to the reactive fluoropolymer mixture. An additional amount of chloroform (2 drops) was added to the AIBN-containing beaker and the wash was subsequently added to the resulting laser-engraveable composition. After stirring, the laser-engraveable composition was knife cast onto Kapton™200-HN as a substrate, clamped securely to a metal plate, and placed in a heating oven with a nitrogen purge at 90° C. for 5 hours or until the resulting laser-engraveable element was fully cured.

COMPARATIVE EXAMPLE CE1

Perfluoropolyether bisurethane methacrylate oligomer (1.69 g) was sonicated with Cabot Mogul® L carbon black (5 weight %). AIBN (1.2 weight %) was dissolved in several drops of chloroform and added to the resulting reactive fluoropolymer mixture. After stirring, the resulting laser-engraveable composition was knife cast onto Kapton™ 200-HN as a substrate, clamped securely to a metal plate, and placed in a heating oven with a nitrogen purge at 90° C. until the resulting laser-engraveable element was fully cured.

COMPARATIVE EXAMPLE CE2

Perfluoropolyether bisurethane methacrylate oligomer (1.68 g) was sonicated with Cabot Regal® 330 A67 carbon black (5 weight %). AIBN (1.2 weight %) was dissolved in several drops of chloroform and added to the resulting reactive fluoropolymer mixture. After stirring, the resulting laser-engraveable composition was knife cast onto Kapton™ 200-HN as a substrate, clamped securely to a metal plate, and placed in a heating oven with a nitrogen purge at 90° C. until the resulting laser-engraveable element was fully cured.

COMPARATIVE EXAMPLE CE3

Perfluoropolyether bisurethane methacrylate oligomer (1.72 g) was sonicated with Cabot Regal® 330 A67 carbon black (5 weight %) that had been previously ground with a Tekmar-type blade mill. AIBN (1.2 weight %) was dissolved in several drops of chloroform and added to the resulting reactive fluoropolymer mixture. After stirring, the resulting laser-engraveable composition was knife cast onto Kapton™ 200-HN as a substrate, clamped securely to a metal plate, and placed in a heating oven with a nitrogen purge at 90° C. until the resulting laser-engraveable element was fully cured.

Laser Engraving:

Each laser-engraveable element was laser engraved using a continuous wave (CW) laser operating in the 830 nm range at 25 Watts in 960 channels. The laser beam has a 3 μm spot size (Kodak SQUAREspot® technology) at optimum focus. Each laser-engraveable element was mounted on a flat plate that moved in the Y (fast scan) direction while the laser head moved on an air bearing in the X (slow scan) direction. Pixel placement was on 2 μm centers corresponding to an addressability of 12800 dpi. Imaging was performed at 0.2 m/sec and the corresponding fluence was calculated to be 19.7 J/cm$^2$ for the sum of the 3 consecutive passes. The resulting laser-engraved relief images were examined using a scanning electron microscope.

TABLE I below provides some details about the laser-engraveable elements and TABLE II provides properties of the resulting laser-engraved elements.

TABLE I

Visual Quality of Laser-Engraveable Elements

| Precursor Example | Carbon Black Employed | Smoothness Quality Score |
|---|---|---|
| E1 | Cabot Regal ® 330 A67 (Fluorinated) | 3 |
| CE1 | Mogul ® L | 2 |
| CE2 | Cabot Regal ® 330 A67 | 1 |
| CE3 | Cabot Regal ® 330 A67 (Ground) | 3 |

The Smoothness Quality Score was quantified visually as follows:
3 = Smooth laser-engraveable element of high quality that cured with very few bumps and pits.
2 = Relatively smooth laser-engraveable element of medium quality that cured with some noticeable bumps and pits.
1 = Very rough laser-engraveable element of poor quality that cured poorly with obvious phase separation, bumps, and pits.

TABLE II

| Example | Carbon Black Employed | Ablation (engraved) score |
|---|---|---|
| E1 | Cabot Regal ® 330 A67 (Fluorinated) | 3 |
| CE1 | Mogul ® L | 2 |
| CE2 | Cabot Regal ® 330 A67 | 1 |
| CE3 | Cabot Regal ® 330 A67 (Ground) | 2 |

The Ablation Quality was quantified visually from the laser-engraved elements that were imaged by scanning electron microscopy (SEM) wherein:
3 = Well-defined laser-engraved features in the relief image, with a relatively smooth floor.
2 = Some well-defined laser-engraved features in the relief image, with obvious bumps and porosity in the floor.
1 = Poorly defined laser-engraved features with little to no relief image.

These results illustrate that only the compositions of the fluoropolymers that include the near-infrared radiation absorber that has been fluoro-functionalized according to this invention provide good quality precursors that can be laser engraved to provide precise quality image features with good relief.

Contact Angles:

Static contact angle measurements of water droplets on the laser-engraveable elements described above were obtained at 22° C. in air using a pendant drop delivered from an automated syringe pump in an FTA 200 system designed for contact angle determination. Each drop was placed controllably on the laser-engraveable surface of each laser-engraveable element. The results are shown below in TABLE III and compared to results obtained for commercially available flexographic printing plate precursors.

These results show surface energy modification by an increase in the water contact angle after creation of the fluorinated laser-engraveable element when compared to commercially available flexographic printing plate precursors outside of this invention.

TABLE III

| Precursor | Description | Water Contact Angle (°) |
|---|---|---|
| E1 | Perfluoropolyether with Cabot Regal ® 330 A67 (Fluorinated) | 111.2 |
| CE1 | Perfluoropolyether with Mogul ® L | 114.0 |
| CE2 | Perfluoropolyether with Cabot Regal ® 330 A67 | 109.6 |
| CE3 | Perfluoropolyether with Cabot Regal ® 330 A67 (Ground) | 116.2 |
| CE4 | Laserflex ® FP6001 from Fulflex Flexographic Systems flexographic printing plate precursor | 87.0 |
| CE5 | Flexcel ® flexographic printing plate precursor (Eastman Kodak) | 70.8 |

The invention has been described in detail with particular reference to certain preferred embodiments thereof, but it will be understood that variations and modifications can be effected within the spirit and scope of the invention.

The invention claimed is:

1. A flexographic printing precursor comprising a thermally crosslinked laser-engraveable layer comprising a crosslinked elastomeric fluoropolymer and a fluoro-functionalized near-infrared radiation absorber, the crosslinked fluoropolymer having a glass transition temperature of less than and including 0° C., the crosslinked laser-engraveable layer being formed from a reactive fluoropolymer composition comprising a reactive fluoropolymer, the fluoro-functionalized near-infrared radiation absorber, and a compound that causes crosslinking of the reactive fluoropolymer during thermal curing, wherein the reactive fluoropolymer is selected from the group consisting of: poly(tetrafluoroethylene oxide-co-difluoromethylene oxide) α, ω-diol bis(2,3-dihydroxypropyl ether), poly(tetrafluoroethylene oxide-co-difluoromethylene oxide) α, ω-diol, ethoxylated poly(tetrafluoroethylene oxide-co-difluoromethylene oxide) α, ω-diol, and a multifunctional (meth)acrylate end-functionalized derivative of one of such compounds.

2. The flexographic printing precursor of claim 1, wherein the fluoro-functionalized near-infrared radiation absorber is a fluoro-functionalized carbon black, fluoro-functionalized carbon nanotube, fluoro-functionalized graphene, or fluoro-functionalized dye, or a mixture or combination of any of these materials.

3. The flexographic printing precursor of claim 1, wherein the fluoro-functionalized near-infrared radiation absorber is a fluoro-functionalized carbon black that is present in an amount of at least 1 weight % and up to and including 35 weight %, based on the total dry reactive fluoropolymer composition weight.

4. The flexographic printing precursor of claim 1, further comprising one or more materials selected from the group consisting of hollow, solid, or porous particles, surfactants, plasticizers, lubricants, non-fluorinated resins, and microspheres, in the crosslinked laser-engraveable layer.

5. The flexographic printing precursor of claim 1, wherein the reactive fluoropolymer has a number average molecular weight of at least 1000 g/mol.

6. The flexographic printing precursor of claim 1, further comprising a substrate on which the thermally crosslinked laser-engraveable layer is disposed.

7. The flexographic printing precursor of claim 5, further comprising an elastomeric rubber compressible layer between the substrate and the thermally crosslinked laser-engraveable layer.

8. The flexographic printing precursor of claim 5, further comprising a conductive layer between the substrate and the thermally crosslinked laser-engraveable layer.

9. The flexographic printing precursor of claim 5, wherein the substrate comprises a polyimide, polyester, or a fabric web adhered to a polyester film.

10. The flexographic printing precursor of claim 9, further comprising an elastomeric rubber compressible layer between the substrate and the thermally crosslinked laser-engraveable layer.

11. The flexographic printing precursor of claim 1, wherein the crosslinked fluoropolymer is present in an amount of at least 30 weight % and up to and including 99 weight %, based on the total weight of the thermally crosslinked laser-engraveable layer.

12. The flexographic printing precursor of claim 1, wherein the crosslinked fluoropolymer has a glass transition temperature of at least −100° C. and up to and including 0° C.

13. The flexographic printing precursor of claim 1, wherein the weight ratio of the crosslinked fluoropolymer to the fluoro-functionalized near-infrared radiation absorber being from 19:1 to and including 4:1.

* * * * *